US012798375B2

(12) United States Patent
Adiththan et al.

(10) Patent No.: US 12,798,375 B2
(45) Date of Patent: Nov. 17, 2026

(54) AUTOMATED DESIGN SYSTEMS AND METHODS FOR HUMAN-MACHINE INTERFACE (HMI) CONFIGURATION AND OPERATION

(71) Applicant: GM GLOBAL TECHNOLOGY OPERATIONS LLC, Detroit, MI (US)

(72) Inventors: Arun Adiththan, Sterling Heights, MI (US); Aravind Gangumalla, Novi, MI (US); Vikramaditya Nimmagadda, Washington, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 121 days.

(21) Appl. No.: 18/893,203

(22) Filed: Sep. 23, 2024

(65) Prior Publication Data

US 2026/0084523 A1 Mar. 26, 2026

(51) Int. Cl.
*B60K 35/20* (2024.01)
*G06F 40/30* (2020.01)
(Continued)

(52) U.S. Cl.
CPC .............. *B60K 35/20* (2024.01); *G06F 40/30* (2020.01); *G06Q 10/06375* (2013.01); *G10L 15/26* (2013.01)

(58) Field of Classification Search
CPC ........ B60K 35/20; B60K 35/00; B60K 35/10; B60K 35/212; G06F 40/30; G06Q 10/06375; G10L 15/26
See application file for complete search history.

(56) References Cited

U.S. PATENT DOCUMENTS

| | | | |
|---|---|---|---|
| 7,506,309 | B2 | 3/2009 | Schaefer |
| 9,374,355 | B2 | 6/2016 | Schwarz |

(Continued)

OTHER PUBLICATIONS

Duan, et al.; Generating Automatic Feedback on UI Mockups with Large Language Models; Proceedings of the 2024 CHI Conference on Human Factors in Computing Systems. 2024. S. 1-20.

(Continued)

*Primary Examiner* — Vijay Shankar
(74) *Attorney, Agent, or Firm* — Quinn IP Law

(57) ABSTRACT

A method of operating an automated design system for configuring a human-machine interface (HMI) device includes a large-language model (LLM) module of the automated design system receiving a set of HMI system development metrics, including system requirements data, system objectives data, and/or source code data, and using these HMI system development metrics to generate an interaction sequence script containing a sequence of steps for executing an HMI feature on the HMI device. A system controller configures the HMI device using the set of HMI system development metrics and then generates a feedback log containing feedback data received from test clinic contributors using the interaction sequence script to test the configured HMI device. A multimodal generative artificial intelligence (AI) module generates a set of proposed HMI changes using the feedback data. The system controller then reconfigures the HMI device using a subset of HMI changes selected from the proposed HMI changes.

20 Claims, 4 Drawing Sheets

(51) Int. Cl.

| | |
|---|---|
| ***G06Q 10/0637*** | (2023.01) |
| ***G10L 15/26*** | (2006.01) |

(56) References Cited

U.S. PATENT DOCUMENTS

| | | | | |
|---|---|---|---|---|
| 12,211,598 | B1 * | 1/2025 | Aravamudan | G16H 10/60 |
| 12,217,744 | B2 * | 2/2025 | Otani | G06F 40/35 |
| 12,488,131 | B2 * | 12/2025 | Roper, Jr. | G06F 21/6218 |
| 2010/0082559 | A1 | 4/2010 | Sumcad | |
| 2014/0380296 | A1 | 12/2014 | Pal | |
| 2016/0266886 | A1 | 9/2016 | Sarkar | |
| 2025/0284877 | A1 * | 9/2025 | Pandey | G06F 16/345 |
| 2025/0378283 | A1 * | 12/2025 | Krishnamani | G06F 40/58 |
| 2026/0025344 | A1 * | 1/2026 | Chorakhalikar | H04L 51/02 |

OTHER PUBLICATIONS

Ma, et al. Development and evaluation study of intelligent cockpit in the age of large models. arXiv preprint arXiv:2409.15795. 2024.

Liu, et al.; Chatting with gpt-3 for zero-shot human-like mobile automated gui testing. arXiv preprint arXiv:2305.09434. 2023.

* cited by examiner

AUTOMATED DESIGN SYSTEMS AND METHODS FOR HUMAN-MACHINE INTERFACE (HMI) CONFIGURATION AND OPERATION

INTRODUCTION

The present disclosure relates generally to human-machine interface devices. More specifically, aspects of this disclosure relate to systems and methods for configuring and operating interactive telematics units and digital instrument panels of motor vehicles.

Current production motor vehicles, such as the modern-day automobile, may be originally equipped with a resident network of electronic control units and interactive interface devices that provide enhanced driving and vehicle control features. As vehicle processing, communication, and sensing capabilities improve, manufacturers persist in offering more automated driving capabilities with the aspiration of producing fully autonomous "self-driving" vehicles competent to navigate among heterogeneous vehicle types in both urban and rural scenarios. Original equipment manufacturers (OEM) are moving towards vehicle-to-vehicle (V2V) and vehicle-to-infrastructure (V2I) "talking" cars with higher-level driving automation that employ autonomous control systems to enable real-time vehicle routing with automated steering, lane changing, scenario planning, etc. Automated path planning systems, for example, utilize vehicle state and dynamics sensors, geolocation information, map and road condition data, and path prediction algorithms to provide route derivation with lane center and lane change forecasting.

To provide occupants with telecommunications and informatics functionality, many vehicle passenger compartments are now furnished with a centerstack telematics unit and an interactive digital instrument cluster that operate as both human-machine interfaces (HMI) and an in-vehicle computing devices. The telematics unit, for example, may wirelessly connect to a cellular network or a satellite service for such purposes as real-time navigation assistance, customer support, vehicle tracking, system diagnostics, traffic data, and satellite radio and telephony services. In addition to wireless telecommunication features, the telematics unit also functions as a bidirectional interface by which vehicle occupants interact with and control an assortment of resident vehicle subsystems. During the initial design cycle and lifetime of a vehicle, it may be desirable to develop or reprogram the in-vehicle telematics unit, for example, to support new features and functionality or to resolve potential issues with existing features and functionality.

SUMMARY

Presented below are automated design systems with attendant control logic for configuring and controlling HMI devices, methods for making and methods for operating such systems, and in-vehicle HMI devices developed using such systems. By way of example, and not limitation, a generative AI-based method automates manual and repetitive design tasks to improve quality, reduce human-borne error, and increase efficiency during the software development lifecycle of an HMI. A code interpreter and language model (CILM) module processes prototype software implementations and generates interaction sequences for a designated group of "stakeholders," which may include user-experience (UX) designers, leadership, and end-user participants. The CILM module may use a suite of generative AI models to automate creation of interaction sequences from source code, system prototyping requirements, design objectives, etc. A large language model insights (LLMI) module provisions transcription, summarization, and generation of actionable procedures from stakeholder feedback. The LLMI module may observe interactions and feedback in a variety of modes—verbal and non-verbal—and process this data using multimodal generative models. A code interpreter and generative AI-based deployment (CIAID) module makes on-the-fly changes in the prototype software implementation. The CIAID module may use code generation models to translate change requirements into code changes for deployment with a subject HMI device.

Aspects of this disclosure are directed to AI-based HMI software development protocols and processor-executable control logic for configuring and operating HMI devices. In an example, a method is presented for operating an automated design system for configuring an HMI device, such as in-vehicle telematics units, digital instrument panels (IP), radio interfaces, rear entertainment touchscreen panels, etc. This representative method includes, in any order and in any combination with any of the above and below disclosed options and features: receiving, e.g., via a code interpreter LLM module of the automated design system from a developer/UX researcher, a set of HMI system development assets/metrics that includes system requirements data, system objectives data, and/or source code data; generating, e.g., via the LLM module using the received set of HMI system development assets/metrics, an interaction sequence script that contains a sequence of steps for executing a new or redesigned HMI feature on the HMI device; configuring, e.g., via a resident or remote microcontroller, central processor, control module, programmable logic device, or network of processors/controllers/modules/devices (collectively "system controller"), the HMI device using the received HMI system development assets/metrics; generating and storing, e.g., via the system controller and a resident storage database, a feedback log that contains feedback data received from a group of test clinic contributors using the interaction sequence script to test the HMI feature on the configured HMI device; generating, e.g., via a multimodal generative AI module of the automated design system (e.g., a bidirectional encoder representations from transformers (BERT) model and a long short-term memory (LSTM) deep neural network (DNN) model), a set of proposed HMI changes using the feedback data; and reconfiguring, e.g., via the system controller, the HMI device using only a subset of HMI changes selected from the set of proposed HMI changes.

Additional aspects of this disclosure are directed to automated design systems with attendant control logic for developing, reconfiguring and deploying new or updated HMI devices, including wireless-enabled, interactive touchscreen display devices of a motor vehicle. As used herein, the terms "vehicle" and "motor vehicle" may be used interchangeably and synonymously to include any relevant vehicle platform, such as passenger vehicles, commercial vehicles, industrial vehicles, off-road and all-terrain vehicles (ATV), motorcycles, farm equipment, aircraft, watercraft, spacecraft, etc. It is envisioned that disclosed HMI development concepts may be applied to both automotive and non-automotive applications alike. In an example, an automated design system is presented for configuring HMI devices. The automated design system includes, inter alia, a large-language model module that: receives a set of HMI system development assets/metrics, including system requirements data, system objectives data, and source code data; uses the received set of HMI system development assets/metrics to generate an interaction sequence script containing a sequence of steps for executing an HMI feature on the HMI device.

Continuing with the foregoing discussion, the automated design system also includes a system controller that: configures the HMI device using the received set of HMI system development assets/metrics; and generates and stores a feedback log containing feedback data received from a group of test clinic contributors using the interaction sequence script to test the HMI feature on the configured HMI device; and a multimodal generative AI module that processes feedback and generates software change requirements ("HMI changes") to address the feedback. The system controller reconfigures the HMI device using a select set of HMI changes that may be prioritized.

Aspects of this disclosure are also directed to computer-readable media (CRM) containing controller-executable instructions for developing and deploying new or updated features on interactive HMI devices. In an example, a non-transient CRM stores instructions that are executable by one or more system controllers and/or one or more system control modules of an automated design system. These CRM-stored instructions, when executed by the controller(s) and/or control module(s), cause the automated design system to perform operations, including: receiving, via an LLM module, a set of HMI system development assets/metrics including system requirements data, system objectives data, and/or source code data; generating, via the LLM module using the received set of HMI system development metrics, an interaction sequence script containing a sequence of steps for executing an HMI feature on the HMI device; configuring the HMI device using the received set of HMI system development metrics; generating a feedback log containing feedback data received from a group of test clinic contributors using the interaction sequence script to test the configured HMI device; generating, via a multimodal generative AI module, a set of proposed HMI changes using the feedback data; and reconfiguring the HMI device using a subset of HMI changes selected from the set of proposed HMI changes.

For any of the disclosed systems, methods, and CRM, the contributor feedback data contained in the feedback log may include multiple feedback statements. In this instance, generating a set of proposed HMI changes may include: determining, for each feedback statement, an intent integer that is predictive of a projected intent of the contributor who produced that feedback statement; and determining, for each feedback statement, a sentiment integer that is predictive of a projected sentiment of the contributor who produced that feedback statement. Generating a set of proposed HMI changes may also include calculating a weighted score $W_n$ for each feedback statement as:

$$W_n = S_n * U_n 1 + S_n * U_n 2 \ \ldots \ S_n * U_n i = \sum_{i=1}^{j} (S_n * U_n i)$$

where $S_n$ is the sentiment integer of feedback statement N; and $U_n$ is the intent integer of the feedback statement N. As another option, selecting a subset of HMI changes may include filtering the proposed HMI changes based on the weighted scores of the feedback statements and a utility function that is predictive of a return on investment (ROI) for each of the proposed HMI changes.

For any of the disclosed systems, methods, and CRM, the system controller may transcribe user-feedback audio and video files contained in the feedback data, and summarize the transcribed audio and video files to identify and retain key information within the feedback data (e.g., discarding non-key data). As another option, generating an interaction sequence script may include a BERT language model summarizing each HMI feature in the set of HMI system development metrics to include a feature objective, a feature process, and a feature result. In this instance, the feature objective may define how to modify the HMI feature to enable a user of the HMI device to use the HMI feature, the feature process may defines how to reconfigure the HMI device to modify the HMI feature to achieve the feature objective, and the feature result defines a resultant reconfigured HMI feature upon implementation of the feature process to achieve the feature objective. Generating an interaction sequence script may also include a Generative Pre-trained Transformer (GPT) model or a trained Bard transformation language model (BARD) generating the sequence of steps for executing the HMI feature using the summaries of the HMI features in the set of HMI system development metrics.

For any of the disclosed systems, methods, and CRM, the automated design system may receive, e.g., from an HMI software developer and/or UX researcher, a set of instructions to reorder the sequence of steps in the interaction sequence script for executing the HMI feature on the HMI device. Once received, the system controller may reorder the sequence of steps for executing the HMI feature based on the set of instructions. As another option, reconfiguring an HMI device may include a code-generator LLM modifying the source code of the subject HMI device based on the subset of HMI changes. While not per se limited, the HMI device may be a digital instrument panel, interactive telematics unit, interactive touchscreen panel, or entire in-vehicle HMI system of an automobile. In this instance, the system controller may deploy the modified source code to the digital IP/telematics unit/touchscreen panel, e.g., prior to or after being installed on the vehicle.

For any of the disclosed systems, methods, and CRM, the feedback data received from the group of test clinic contributors may include audio data, video data, and/or biometric data from one or more end-user clinic participants. The feedback data may also include contributor feedback from a set of stakeholders (e.g., designers, program managers, engineers, etc.). As a further option, the system requirements data may include a list of interactive features and corresponding feature characteristics by which a user operates and controls the HMI device. Moreover, the system objectives data may include a list of design objectives by which the user navigates and interacts with the HMI device and uses the interactive features. The source code data may include an HMI system architecture and attendant software code for provisioning the HMI device.

The above summary does not represent every embodiment or every aspect of the present disclosure. Rather, the foregoing summary merely provides a synopsis of some of the novel concepts and features set forth herein. The above features and advantages, and other features and attendant advantages of this disclosure, will be readily apparent from the following Detailed Description of illustrated examples and representative modes for carrying out the disclosure when taken in connection with the accompanying drawings and appended claims. Moreover, this disclosure expressly includes any and all combinations and subcombinations of the elements and features presented above and below.

Figure 1:
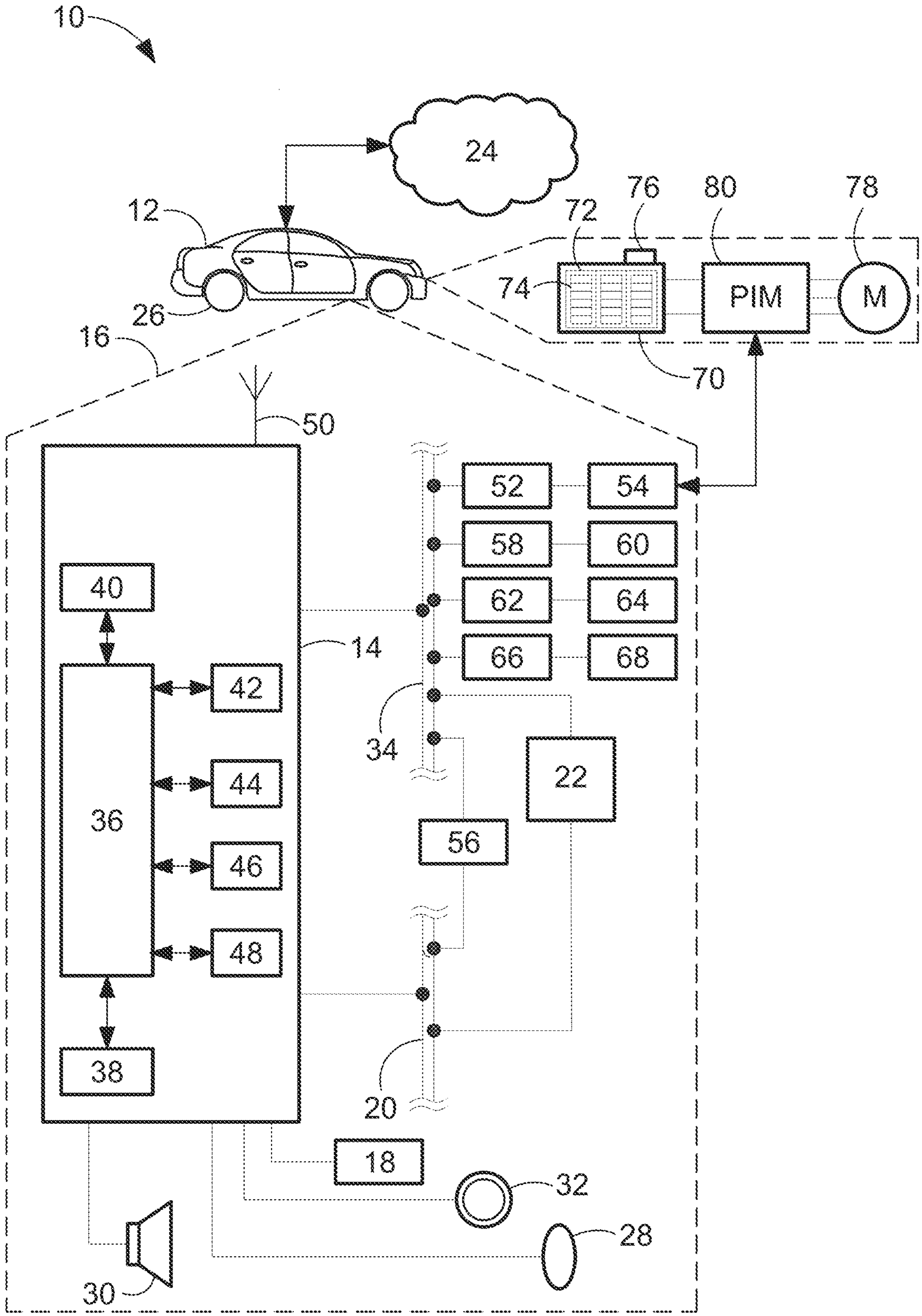
FIG. 1 is a partially schematic, side-view illustration of a representative motor vehicle with a network of in-vehicle controllers, HMI devices, sensing devices, and communication devices with which aspects of the present disclosure may be practiced.

The present disclosure is amenable to various modifications and alternative forms, and some representative embodiments of the disclosure are shown by way of example in the drawings and will be described in detail herein. It should be understood, however, that the novel aspects of this disclosure are not limited to the particular forms illustrated in the above-enumerated drawings. Rather, this disclosure covers all modifications, equivalents, combinations, permutations, groupings, and alternatives falling within the scope of this disclosure as encompassed, for example, by the appended claims.

DETAILED DESCRIPTION

This disclosure is susceptible of embodiment in many different forms. Representative embodiments of the disclosure are shown in the drawings and will herein be described in detail with the understanding that these embodiments are provided as an exemplification of the disclosed principles, not limitations of the broad aspects of the disclosure. To that extent, elements and limitations that are described, for example, in the Abstract, Introduction, Summary, Brief Description of the Drawings, and Detailed Description sections, but not explicitly set forth in the claims, should not be incorporated into the claims, singly or collectively, by implication, inference or otherwise. Moreover, recitation of "first", "second", "third", etc., in the specification or claims is not per se used to establish a serial or numerical limitation; unless specifically stated otherwise, these designations may be used for ease of reference to similar features in the specification and drawings and to demarcate between similar elements in the claims.

For purposes of this disclosure, unless specifically disclaimed: the singular includes the plural and vice versa (e.g., indefinite articles "a" and "an" should generally be construed as meaning "one or more"); the words "and" and "or" shall be both conjunctive and disjunctive; the words "any" and "all" shall both mean "any and all"; and the words "including," "containing," "comprising," "having," and the like, shall each mean "including without limitation." Moreover, words of approximation, such as "about," "almost," "substantially," "generally," "approximately," and the like, may each be used herein to denote "at, near, or nearly at," or "within 0-5% of," or "within acceptable manufacturing tolerances," or any logical combination thereof, for example.

Referring now to the drawings, wherein like reference numbers refer to like features throughout the several views, there is shown in FIG. 1 a representative motor vehicle, which is designated generally at 10 and portrayed herein for purposes of discussion as a sedan-style, electric-drive automobile. The illustrated automobile 10—also referred to herein as "motor vehicle" or "vehicle" for short—is merely an exemplary application with which aspects of this disclosure may be practiced. In the same vein, execution of the present concepts for a centerstack telematics unit of an automobile should be appreciated as a non-limiting implementation of disclosed features. As such, it will be understood that aspects and features of this disclosure may be applied to an assortment of in-vehicle HMI devices, incorporated into any logically relevant type of motor vehicle, and implemented for both automotive and non-automotive applications. Moreover, only select components of the motor vehicle and telematics system are shown and described in detail herein. Nevertheless, the vehicles and systems discussed below may include numerous additional and alternative features, and other available peripheral hardware, for carrying out the various methods and functions of this disclosure.

The representative vehicle 10 of FIG. 1 is originally equipped with a vehicle telecommunications and information ("telematics") unit 14 that wirelessly communicates, e.g., via cellular network, satellite service, wireless-enabled modem, etc., with a remotely located cloud computing host service 24 (e.g., ONSTAR®). Some of the other vehicle hardware components 16 shown generally in FIG. 1 include, as non-limiting examples, an electronic video display device 18, a microphone 28, audio speaker(s) 30, and assorted user input controls 32 (e.g., buttons, knobs, pedals, switches, touchpads, touchscreens, etc.). These hardware components 16 function, in part, as a human/machine interface (HMI) that enables a user to communicate with the telematics unit 14 and other components resident to and remote from the vehicle 10. Microphone 28, for instance, provides occupants with a means to input verbal commands; the vehicle 10 may be equipped with an embedded voice-processing unit utilizing audio filtering, editing, and analysis modules. Conversely, the speaker 30 provides audible output to a vehicle occupant and may be either a stand-alone speaker dedicated for the telematics unit 14 or may be part of an audio system 22. The audio system 22 is connected to a network connection interface 34 and an audio bus 20 to receive analog information, rendering it as sound, via one or more speaker components.

Communicatively coupled to the telematics unit 14 is a network connection interface 34, suitable examples of which include twisted pair/fiber optic Ethernet switches, parallel/serial communications buses, local area network (LAN) interfaces, controller area network (CAN) interfaces, and the like. The network connection interface 34 enables the vehicle hardware 16 to send and receive signals with one another and with various systems both onboard and off-board the vehicle body 12. This allows the vehicle 10 to perform assorted vehicle functions, such as modulating powertrain output, activating friction and regenerative brake systems, controlling vehicle steering, and other automated functions. For instance, telematics unit 14 may exchange signals with a Powertrain Control Module (PCM) 52, an Advanced Driver Assistance System (ADAS) module 54, an Electronic Battery Control Module (EBCM) 56, a Steering Control Module (SCM) 58, a Brake System Control Module (BSCM) 60, and assorted other vehicle ECUs, such as a transmission control module (TCM), engine control module (ECM), Sensor System Interface Module (SSIM), etc.

With continuing reference to FIG. 1, telematics unit 14 is an onboard computing device that provides a mixture of services, both individually and through its communication with other networked devices. This telematics unit 14 may be generally composed of one or more processors 40, each of which may be embodied as a discrete microprocessor, an application specific integrated circuit (ASIC), or a dedicated control module. Vehicle 10 may offer centralized vehicle control via a central processing unit (CPU) 36 that is operatively coupled to a real-time clock (RTC) 42 and one or more electronic memory devices 38, each of which may take on the form of a CD-ROM, magnetic disk, IC device, a solid-state drive (SSD) memory, a hard-disk drive (HDD) memory, flash memory, semiconductor memory (e.g., various types of RAM or ROM), etc.

Long-range communication (LRC) capabilities with remote, off-board devices may be provided via one or more or all of a cellular chipset/component, a navigation and location chipset/component (e.g., global positioning system (GPS) transceiver), or a wireless modem, all of which are collectively represented at 44. Close-range wireless connectivity may be provided via a short-range communication (SRC) device 46 (e.g., a BLUETOOTH® unit or near field communications (NFC) transceiver), a dedicated short-range communications (DSRC) component 48, and/or a dual antenna 50. The communications devices described above may provision data exchanges as part of a periodic broadcast in a vehicle-to-vehicle (V2V) communication system or a vehicle-to-everything (V2X) communication system, e.g., Vehicle-to-Infrastructure (V2I), Vehicle-to-Pedestrian (V2P), Vehicle-to-Device (V2D), Vehicle-to-Cloud (V2C), etc.

CPU 36 receives sensor data from one or more sensing devices that use, for example, photo detection, radar, laser, ultrasonic, optical, infrared, or other suitable technology, including short range communications technologies (e.g., DSRC) or Ultra-Wide Band (UWB) radio technologies, for executing a controller-automated (AV/ADAS) driving operation or a vehicle navigation service. In accord with the illustrated example, the automobile 10 may be equipped with one or more digital cameras 62, one or more range sensors 64, one or more vehicle speed sensors 66, one or more vehicle dynamics sensors 68, and any requisite filtering, classification, fusion, and analysis hardware and software for processing raw sensor data. The vehicle speed sensor(s) 66 may be in the nature of a mechanical or electromagnetic transmission shaft sensor or electronic wheel speed sensor for detecting vehicle speed. The vehicle dynamics sensor(s) 68 may be in the nature of a single-axis or a triple-axis accelerometer, an angular rate sensor, an inclinometer, steering wheel angle sensor, brake sensor, etc., for detecting longitudinal and lateral acceleration, yaw, roll, and/or pitch rates, steering angle, and other dynamics related parameters. The type, placement, number, and interoperability of the distributed array of in-vehicle sensors may be adapted, singly or collectively, to a given vehicle platform for achieving a desired level of automated vehicle operation.

To propel the motor vehicle 10, an electrified powertrain is operable to generate and deliver tractive torque to one or more of the vehicle's drive wheels 26. The powertrain is represented in FIG. 1 by a rechargeable energy storage system (RESS), which may be in the nature of a chassis-mounted traction battery pack 70, that is operatively connected to an electric traction motor (M) 78. The traction battery pack 70 is generally composed of one or more battery modules 72 each containing a cluster of battery cells 74, such as lithium-class, zinc-class, nickel-class, or organo-silicon-class cells of the pouch, can, or cylindrical type. One or more electric machines, such as traction motor/generator (M) units 78, draw electrical power from and, optionally, deliver electrical power to the battery pack 70. A power inverter module (PIM) 80 electrically connects the battery pack 70 to the motor(s) 78 and modulates the transfer of electrical current therebetween. The battery pack 70 may include an integrated electronics package, such as a wireless-enabled cell monitoring unit (CMU) 76, that enables on-module management, cell sensing, etc.

Discussed below are automated design systems with attendant control logic for configuring and controlling HMI devices using generative AI-based methods to automate manual and repetitive tasks, code interpreter LLM-based methods to generate interaction sequences for the stakeholders, and code interpreter GPT or BARD-based methods for provisioning "on-the-fly" changes in the prototype software implementation. By way of example, a multimodal generative AI model-based system generates an interaction sequence using a variety of sources of information, including screen and system specifications, source code, prototype implementation requirements, user clinic objectives, etc. The multimodal generative AI system uses a variety of methods to observe and record contributor feedback, including verbal and non-verbal feedback, using a variety of audio, visual, and biometric sources. Once filtered, preprocessed and recorded, the system summarizes the contributor feedback data, extracts key insights from the summarized data, derives contributor intent and sentiment from the data, and logs the feedback data. The system then analyzes the feedback log to generate change requirements and prioritize the changes, for example, based on impact frequency, rules and high ROI, case of implementing changes, etc. A code generation AI model processes the proposed HMI changes and derives source code changes to implement the HMI changes. The derived source code is then deployed to the HMI device with attendant software and firmware updates to improve functionality of the device.

Figure 2:
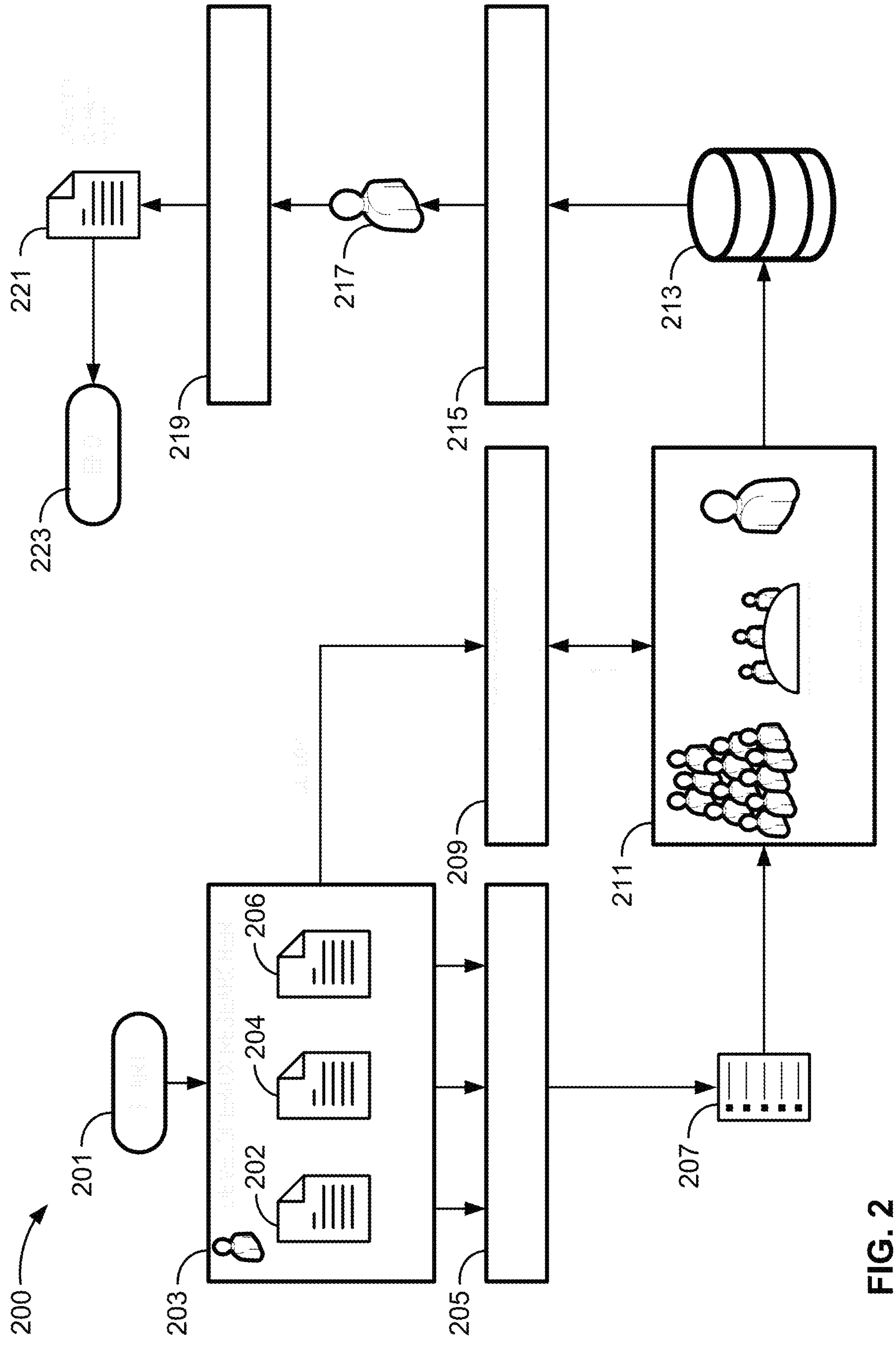
FIG. 2 is a flowchart illustrating a representative control protocol and automated design system for configuring and deploying HMI devices, in which the control protocol may correspond to memory-stored instructions that are executable by a resident or remote microcontroller, central processor, control module, logic circuit, or other integrated circuit (IC) device or network of circuits/modules/microcontrollers/IC devices (collectively "controller") in accordance with aspects of the present disclosure.
Figure 3:
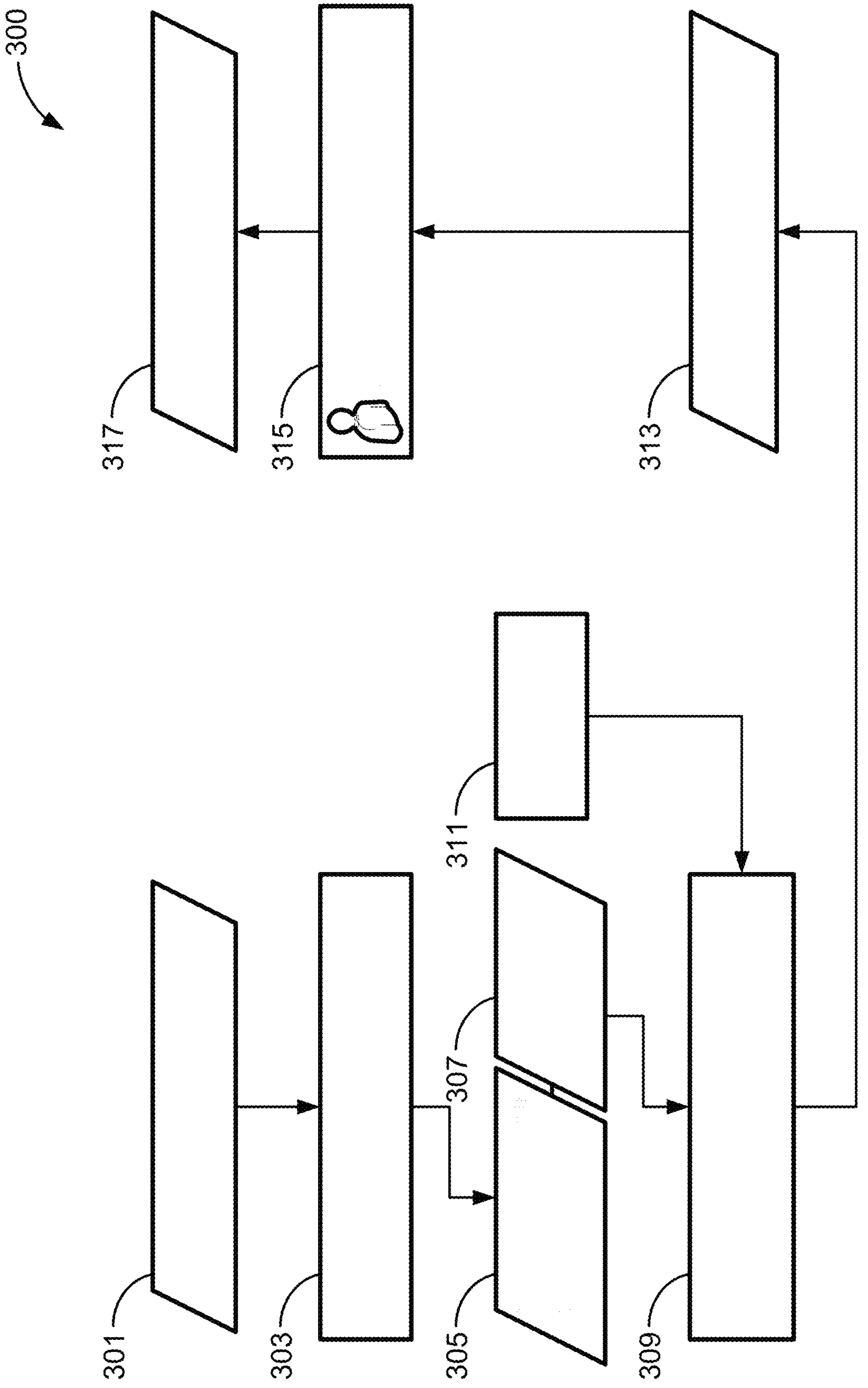
FIG. 3 is a flowchart illustrating a representative large language model (LLM) based control protocol for generating interaction sequence scripts for configuring and deploying HMI devices, which may correspond to memory-stored instructions that are executable by a system controller in accordance with aspects of the present disclosure.
Figure 4:
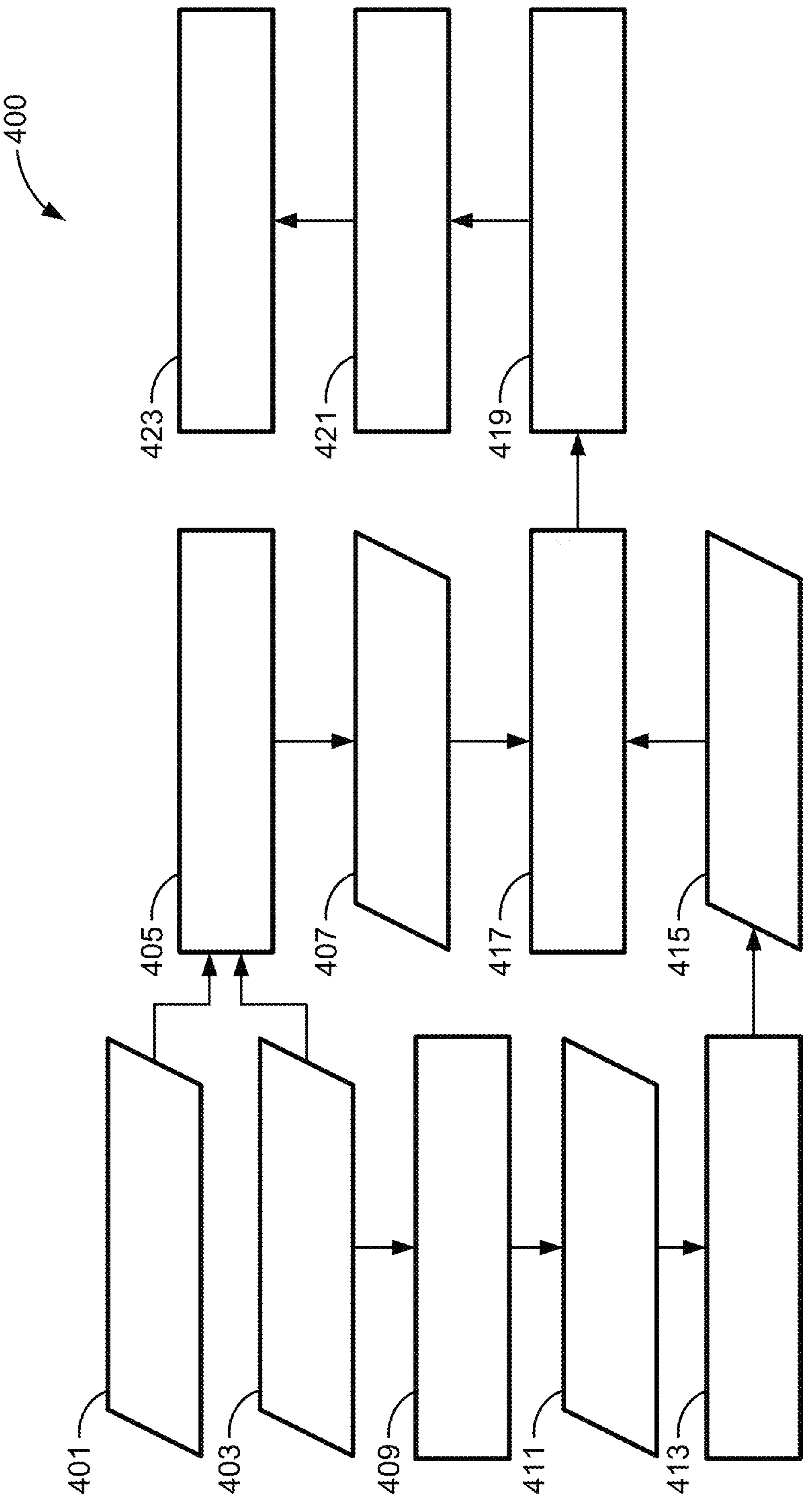
FIG. 4 is a flowchart illustrating a representative multimodal code generation control protocol for generating and testing weighted feedback for configuring and deploying HMI devices, which may correspond to memory-stored instructions that are executable by a system controller in accordance with aspects of the present disclosure.

With reference next to the flow charts of FIGS. 2-4, an improved control protocol and automated design system for configuring and deploying HMI devices, such as the vehicle telematics unit 14 of FIG. 1, is generally described at 200, 300 and 400 in accordance with aspects of the present disclosure. Some or all of the operations illustrated in FIGS. 2-4 and described in further detail below may be representative of an algorithm that corresponds to non-transient, processor-executable instructions that are stored, for example, in main or auxiliary or remote memory (e.g., resident vehicle memory device(s) 38 and/or remote cloud computing service 24 database of FIG. 1). These instructions may be executed, for example, by an electronic controller, processing unit, dedicated control module, logic circuit, or other module or device or network of controllers/modules/devices (e.g., vehicle CPU 36 and/or cloud host service 24 BO server-class computer station of FIG. 1), to perform any or all of the above and below described functions associated with the disclosed concepts. It should be recognized that the order of execution of the illustrated operation blocks may be changed, additional operation blocks may be added, and some of the herein described operations may be modified, combined, or eliminated.

Method 200 may begin at START terminal block 201 of FIG. 2 with memory-stored, processor-executable instructions for initializing a system control protocol for HMI software development using generative AI techniques. This routine may be initialized in real-time, near real-time, continuously, systematically, sporadically, and/or at predefined time intervals, for example, each 10 or 100 milliseconds during use of the telematics unit 14 of FIG. 1. As yet another option, terminal block 201 may initialize in response to a user command prompt (e.g., via telematics 14 input controls), a resident vehicle controller prompt (e.g., from CPU 36), or a broadcast prompt signal received from a centralized back-office (BO) vehicle services system (e.g., from cloud host service 24). By way of non-limiting example, an HMI developer or UX designer may call-up method 200 from a BO server-class computer station during an initial design cycle and lifetime of a subject HMI device. Upon completion of some or all of the control operations presented in FIG. 2, method 200 may advance to END terminal block 223 and temporarily terminate or, optionally, may loop back to terminal block 201 and run in a continuous loop.

Advancing from terminal block 201 to SYSTEM ASSETS data input block 203, the method 200 may receive as inputs a set of HMI system development assets/metrics containing details for developing new or updated features on an HMI device. In accord with the illustrated example, a group of interested stakeholders (e.g., HMI developers, UX designers, leadership, etc.) provides a set of system requirements 202, a set of system objectives 204, and a source code 206 for a subject HMI device. System requirements 202 data may include a list of new or updated interactive features with corresponding feature characteristics by which an end-user operates the subject HMI device (e.g., total number of user-selectable icons; designation of each icon's function; location, design and size of each icon; background/foreground colors of interface; etc.). Comparatively, the system objectives 204 data may include a list of design objectives by which the user interacts with the HMI device and uses the new/updated interactive features (e.g., where does the user find a particular feature within the HMI system architecture; how does the user select and/or control each feature; how does the HMI convey feature's function, etc.). HMI system source code 206 data may include an HMI system architecture with attendant software code for provisioning the interactive HMI device features.

Upon receipt of the requisite HMI system development metrics, method 200 may execute LARGE LANGUAGE MODEL subroutine block 205 and feed the received data into a generative AI-based LLM module. The LLM module may be trained via unsupervised deep neural network (DNN) learning techniques from related HMI development datasets to use the HMI system development metrics as multimodal inputs and natural language prompts to generate an interaction sequence script, as indicated at INTERACTION SCRIPT document output block 207. An interaction sequence script may contain an introductory usability test script that provides an overview and background information for interacting with the subject HMI device, general instructions for operating the HMI device, and a sequence of steps for executing one or more of the new/updated HMI features for the subject HMI device. The interaction sequence script may also provide a predefined set of feedback prompts by which a contributor enters feedback when attempting to operate a designated interactive feature on the HMI device. Additional information regarding the generation of interaction sequence scripts is provided below in the discussion of FIG. 3.

In tandem with deriving a sequence script for interacting with the HMI device, method 200 may execute HMI UPDATE subroutine block 209 and deploys compiled source code based on the HMI system development assets/metrics to a test HMI device (e.g., target platform in an emulator, on a test bench, or within a vehicle). For instance, a resident system controller of the automated design system may configure an in-cabin telematics unit or a test-bench telematics emulator using the set of HMI system development metrics received at block 203. A group of test clinic contributors—end-user clinic participants, stakeholders, leadership, etc. —uses the interaction sequence script generated at block 207 to test the HMI device configured at block 209. At INTERACT & FEEDBACK data input block 211, these test clinic contributors may produce feedback data that details each contributor's experience while interacting with the HMI device to use the new/updated HMI feature(s). Proceeding to FEEDBACK LOG database block 213, method 200 may generate and store a feedback log that contains the contributor feedback data generated at block 211. This feedback data may include audio data, video data, biometric data, temporal data, and observational data for one or more of the contributors in the test clinic group.

After generating and storing contributor feedback, method 200 proceeds to process and evaluate user feedback to extract therefrom actionable insights for reconfiguring and controlling the subject HMI device. For instance, method 200 may execute MULTIMODAL MODEL subroutine block 215 whereby a multimodal generative AI module derives a set of proposed HMI changes based on the feedback data. The multimodal module may process a variety of different data sources and formats (e.g., audio, video, text, sensor data, etc.) to form insights with proposed change requirements. A developer/UX researcher may thereafter review the proposed HMI changes and decide which changes are "core" and should therefore be implemented. For instance, ACCEPT/REJECT subroutine block 217 may provision executable code whereby a verified developer and/or researcher inputs a set of instructions to: (1) accept a proposed change; (2) reject a proposed change; (3) modify a proposed change; (4) table a proposed change for future evaluation; and/or (5) reorder a sequence of steps for executing the HMI feature on the HMI device. The decision to accept/reject/prioritize a proposed change may be based on a utility function indicative of a return on investment (ROI) for making that change. It may depend on feedback log analysis from which the system infers how many contributors desired a specific change, how strong was that preference, etc. Upon receipt of the verified developer/researcher's instructions, method 200 may deny and discard or, alternatively, may accept and implement any or all of their proposed modifications (e.g., reorder the step sequence for executing the new/updated HMI feature based on the instruction set).

With continuing reference to FIG. 2, method 200 may advance to SOURCE CODE GENERATION subroutine block 219 and employs a code interpreter and generative AI-based deployment (CIAID) module to automate alterations to the prototype software in order to implement one or more of the proposed HMI changes. The CIAID module may use code generation models (e.g., Megatron-Turing Natural Language Generation (MT-NLG) model or other monolithic transformer language model) to translate change requirements into code changes for deployment with the subject HMI device. The HMI source code may be updated at SOURCE CODE document output block 221 and concomitantly deployed to the subject HMI device. In so doing, the automated design system reconfigures the HMI device using a select subset of HMI changes chosen from the initial set of proposed HMI changes. For instance, the system controller may complete a final code review then commit and push code changes to an in-vehicle telematics units, digital instrument panels (IP), and/or interactive touchscreen panel; the HMI system may reboot to allow the device driver and any related HMI files to update. Additional information regarding processing user feedback to extract actionable insights and pushing updated source code for HMI development is provided below in the discussion of FIG. 4. At this juncture, the method 200 may temporarily terminate at END terminal block 223 or may loop back to START terminal block 201.

FIG. 3 presents an LLM-based control method 300 for generating interaction sequence scripts to facilitate configuring and controlling HMI devices. Method 300 may start at SYSTEM METRICS file input block 301 and receives a set of system requirement documents and feature files (e.g., system requirements 202 and system objectives 204 in text file format). A feature file may be a text file that stores features, scenarios, and feature description to be tested, and is provided with an extension of "feature" (e.g., Gherkin format). Upon receipt of the requirement document and associated feature files, method 300 may thereafter execute BERT LANGUAGE MODEL subroutine block 303 and feeds the received documents and files into a retrained Bidirectional Encoder Representations from Transformers (BERT) language module. The BERT module may be an open-source machine learning framework for natural language processing (NLP) that is designed to comprehend ambiguous language in text files by using surrounding text to establish context and meaning. The BERT module may be configured as a deep learning model in which every output element is connected to every input element with weightings between them that are dynamically calculated based upon their connection.

Method 300 may advance from subroutine block 303 to FEATURE SUMMARY file output block 305, at which an LLM model formats the information contained in the requirements document and feature files by: (1) objective, (2) process, and (3) result. For instance, the BERT module may summarize each new or updated HMI feature in the set of feature files to include a feature objective, a feature process, and a feature result. The "objective" of an HMI feature may define how that feature is modified to enable a user of the HMI device to use the HMI feature (e.g., modify descriptor and increase font size). Comparatively, a "process" of an HMI feature may define how the HMI device is reconfigured to modify the HMI feature to achieve the corresponding feature objective (e.g., redraw HMI screen layout such that request for larger font size with modified descriptor is accommodated). A "result" of a feature may define the resultant, reconfigured HMI feature upon implementation of the feature process to achieve the corresponding feature objective. At SOURCE CODE file input block 307, the automated design system may receive a text file with the existing HMI system source code for the subject HMI device (e.g., source code 206 of FIG. 2).

After formatting the requirements document and feature files, the method 300 may execute HMI UPDATE subroutine block 309 and deploys the formatted HMI system development metrics to a test HMI device. In accord with the illustrated example, a Generative Pre-trained Transformer (GPT) model or a trained Bard transformation language model (BARD) LLM module executes a user-interface (UI) automation tool (e.g., Appium mobile automation testing tool or Robot Framework automation framework) with a deployment and realization procedure of the feature change(s) after making the change(s) in the HMI source code. The large language model takes the feature summaries and system source code as inputs and generates therefrom a sequence of steps for interfacing with and executing each HMI feature on the HMI device. In the vein of subroutine block 209 of FIG. 2, method 300 of FIG. 3 may concurrently execute HMI UPDATE subroutine block 311 and deploys the HMI system development metrics to a test HMI device.

During the execution of subroutine blocks 309 and 311, the LLM model may simulate HMI system operation and control by interacting with the UI API of the HMI device according to an LLM/HMI interaction script. In response, the HMI system may output as feedback to the LLM model a result script detailing that interaction. The large language model takes the feature summaries and system source code as inputs along with the feedback from the HMI system and uses the UI automation tool to interact with the HMI application to generate an updated sequence of steps for interfacing with and executing each HMI feature. Method 300 may output the updated step sequence to a stakeholder at INTERACTION SEQUENCE file output block 313. A developer, UX researcher or verified user may thereafter analyze the updated step sequence to correct/accept/reject/reorder the steps generated by the LLM for each feature, as indicated at SEQUENCE CORRECTION subroutine block 315. A revised "final" interaction sequence script with selected features to test based on predefined goals may be created and output at INTERACTION SCRIPT document output block 317, e.g., in step with document output block 207 of FIG. 2.

FIG. 4 presents a multimodal code generation control method 400 for producing and testing weighted contributor intent and sentiment feedback to facilitate configuring and controlling HMI devices. Method 400 may start at BIO FEEDBACK sensor data block 401 and CONTRIBUTOR FEEDBACK data input block 403 to respectively receive as inputs a set of biometric data from one or more biometric sensors and a set of audio and/or video data from one or more sound sensors and/or optical sensors. Once received, the method 400 may thereafter execute CONTRIBUTOR INTENT DNN MODEL subroutine block 405, whereat a retrained long short-term memory (LSTM) DNN model may use the biometric data files, audio/video data files, clinic proctor observational data files, etc. to derive a numerical representation of a contributor's intent while testing a new/updated feature on the configured HMI device. Advancing to INTENT INTEGER text output block 407, for example, the automated design system may derive an intent integer for each feedback statement provided by a clinic contributor. This intent integer may be predictive of the intent of the contributor who produced the feedback statement when testing the configured HMI device. The intent indicator may be an integer value that represents the user's intent [−1: negative intent, 0: neutral, 1: positive intent]. Alternatively, the intent indicator may be a fractional value in the range from 0 (no desire) to 1 (maximum desire) to show how much an individual wants the change he or she is describing.

Contemporaneous with automating prediction of contributor intent, method 400 may execute TEXT RANK subroutine block 409 and generate text transcripts for the audio/video data received at CONTRIBUTOR FEEDBACK data input block 403. For instance, a graph-based extractive TextRank (Text Summarization) Natural Language Processing (NLP) algorithm may be employed to extract, transcribe, and summarize contributor feedback transcripts. After transcribing user-feedback audio and video files contained in the HMI system feedback data, the automated design system may summarize the transcribed feedback files to identify and retain key information within the feedback data. At the same time, the design system may automatically deprioritize or jettison non-critical information. Summaries of the feedback transcripts may be output at TRANSCRIPTS SUMMARY document output block 411.

Upon receipt of the summarized feedback transcripts, method 400 may execute LANGUAGE TRANSFORMER MODEL subroutine block 413 and feed the transcript summaries into a BERT language model. The pretrained BERT transformer model extracts summary statements from the received transcripts and derives therefrom a numerical representation of a contributor's sentiment and intensity while testing a new/updated feature on the configured HMI device. Advancing to SENTIMENT INTEGER text output block 415, for example, the automated design system may derive a sentiment integer for each feedback statement provided by a clinic contributor. This sentiment integer may be predictive of the sentiment of the contributor who produced the feedback statement when testing the configured HMI device. The sentiment indicator may be an integer value that represents the user's intent [−1: negative sentiment, 0: neutral, 1: positive sentiment].

After deriving scalar values predicting user intent and sentiment, method 400 may execute WEIGHTED FEEDBACK subroutine block 417 to generate a weighted score for each feedback statement (proposed HMI change) by combining the sentiment and intent integers from the clinic contributors for that statement. By way of example, and not limitation, a weighted score $W_n$ may be calculated for each feedback statement as:

$$W_n = S_n * U_n 1 + S_n * U_n 2 \ \ldots \ S_n * U_n i = \sum_{i=1}^{j} S_n * U_n i$$

where $S_n$ is the sentiment integer for feedback statement n=1 to j; and $U_n i$ is the intent integer for feedback statement n, e.g., analyzed from audio/video of the contributor who expressed that statement. $W_n$ may therefore represent a weighted sum of each statement sentiment and intensity with different user's expressions analyzed from various feedback modalities.

With continuing reference to FIG. 4, method 400 may advance to FEEDBACK FILTER process block 419 and select a subset of to-be-executed HMI changes by filtering the feedback statement (proposed HMI change) based on their weighted scores calculated at subroutine block 417. As mentioned above in the discussion of ACCEPT/REJECT subroutine block 217, the decision to accept/reject/modify/reorder/prioritize a proposed change may be based on a utility function predictive of a return on investment (ROI) for making that proposed HMI change. CODE GENERATION subroutine block 421 may implement a code generation LLM model (e.g., an MT-NLG model) to systematically evaluate the original version of the source code and the filtered change requirements to generate a revised version of the source code to implement the subset of changes. At TEST & DEPLOY process block 423, the automated design system may test and debug the revised source code as adapted with the subset of HMI changes; if satisfactory, the system may release the "new build" of the reconfigured HMI device.

Aspects of this disclosure may be implemented, in some embodiments, through a computer-executable program of instructions, such as program modules, generally referred to as software applications or application programs executed by any of a controller or the controller variations described herein. Software may include, in non-limiting examples, routines, programs, objects, components, and data structures that perform particular tasks or implement particular data types. The software may form an interface to allow a computer to react according to a source of input. The software may also cooperate with other code segments to initiate a variety of tasks in response to data received in conjunction with the source of the received data. The software may be stored on any of a variety of memory media, such as CD-ROM, magnetic disk, and semiconductor memory (e.g., various types of RAM or ROM).

Moreover, aspects of the present disclosure may be practiced with a variety of computer-system and computer-network configurations, including multiprocessor systems, microprocessor-based or programmable-consumer electronics, minicomputers, mainframe computers, and the like. In addition, aspects of the present disclosure may be practiced in distributed-computing environments where tasks are performed by resident and remote-processing devices that are linked through a communications network. In a distributed-computing environment, program modules may be located in both local and remote computer-storage media including memory storage devices. Aspects of the present disclosure may therefore be implemented in connection with various hardware, software, or a combination thereof, in a computer system or other processing system.

Any of the methods described herein may include machine readable instructions for execution by: (a) a processor, (b) a controller, and/or (c) any other suitable processing device. Any algorithm, software, control logic, protocol, or method disclosed herein may be embodied as software stored on a tangible medium such as, for example, a flash memory, a solid-state drive (SSD) memory, a hard-disk drive (HDD) memory, a CD-ROM, a digital versatile disk (DVD), or other memory devices. The entire algorithm, control logic, protocol, or method, and/or parts thereof, may alternatively be executed by a device other than a controller and/or embodied in firmware or dedicated hardware in an available manner (e.g., implemented by an application specific integrated circuit (ASIC), a programmable logic device (PLD), a field programmable logic device (FPLD), discrete logic, etc.). Further, although specific algorithms may be described with reference to flowcharts and/or workflow diagrams depicted herein, many other methods for implementing the example machine-readable instructions may alternatively be used.

Aspects of the present disclosure have been described in detail with reference to the illustrated embodiments; those skilled in the art will recognize, however, that many modifications may be made thereto without departing from the scope of the present disclosure. The present disclosure is not limited to the precise construction and compositions disclosed herein; any and all modifications, changes, and variations apparent from the foregoing descriptions are within the scope of the disclosure as defined by the appended claims. Moreover, the present concepts expressly include any and all combinations and subcombinations of the preceding elements and features.

What is claimed:

1. A method of operating an automated design system for configuring a human-machine interface (HMI) device, the method comprising:

receiving, via a large-language model (LLM) module of the automated design system, a set of HMI system development metrics including at least one of system requirements data, system objectives data, or source code data;

generating, via the LLM module using the received set of HMI system development metrics, an interaction sequence script containing a sequence of steps for executing an HMI feature on the HMI device;

configuring, via a system controller of the automated design system, the HMI device using the received set of HMI system development metrics;

generating a feedback log containing feedback data received from a group of test clinic contributors using the interaction sequence script to test the configured HMI device;

generating, via a multimodal generative artificial intelligence (AI) module of the automated design system, a set of proposed HMI changes using the feedback data; and reconfiguring, via the system controller, the HMI device using a subset of HMI changes selected from the set of proposed HMI changes.

2. The method of claim 1, wherein the feedback data in the feedback log includes multiple feedback statements, and wherein generating the set of proposed HMI changes includes:

deriving an intent integer for each of the feedback statements, the intent integer being predictive of a contributor intent of a contributor who produced the feedback statement; and deriving a sentiment integer for each of the feedback statements, the sentiment integer being predictive of a contributor sentiment of the contributor who produced the feedback statement.

3. The method of claim 2, wherein generating the set of proposed HMI changes further includes calculating a weighted score $W_n$ for each of the feedback statements as:

$$W_n = S_n * U_n 1 + S_n * U_n 2 \ldots S_n * U_n i = \sum_{i=1}^{j} S_n * U_n i$$

where $S_n$ is the sentiment integer of feedback statement n=1 to j; and $U_n$ is the intent integer of the feedback statement N.

4. The method of claim 3, further comprising selecting the subset of HMI changes by filtering the set of proposed HMI changes based on the weighted scores of the feedback statements and a utility function predictive of a return on investment (ROI) for each proposed HMI change in the set of proposed HMI changes.

5. The method of claim 3, further comprising:

transcribing user-feedback audio and video files contained in the feedback data; and summarizing the transcribed user feedback audio and video files to identify and retain key information within the feedback data.

6. The method of claim 1, wherein generating the interaction sequence script includes a Bidirectional Encoder Representations from Transformers (BERT) language model summarizing each of multiple HMI features in the set of HMI system development metrics to include a feature objective, a feature process, and a feature result.

7. The method of claim 6, wherein the feature objective defines how the HMI feature is modified to enable a user of the HMI device to use the HMI feature, the feature process defines how the HMI device is reconfigured to modify the HMI feature to achieve the feature objective, and the feature result defines a reconfigured HMI feature upon implementation of the feature process to achieve the feature objective.

8. The method of claim 6, wherein generating the interaction sequence script further includes a Generative Pre-trained Transformer (GPT) model or a trained Bard transformation language model (BARD) generating the sequence of steps for executing the HMI feature using the summaries of the HMI features in the set of HMI system development metrics.

9. The method of claim 1, further comprising:

receiving, from a developer and/or a researcher, a set of instructions to reorder the sequence of steps for executing the HMI feature on the HMI device; and reordering, via the system controller, the sequence of steps for executing the HMI feature based on the set of instructions.

10. The method of claim 1, wherein reconfiguring the HMI device includes a code-generator LLM modifying a source code of the HMI device based on the subset of HMI changes to generate a modified source code for the HMI device.

11. The method of claim 10, wherein the HMI device includes a digital instrument panel and/or an interactive telematics unit of an automobile, the method further comprising the system controller deploying the modified source code to the digital instrument panel and/or the interactive telematics unit.

12. The method of claim 1, wherein the feedback data includes audio data, video data, and/or biometric data from one or more end-user contributors in the group of test clinic contributors.

13. The method of claim 1, wherein the system requirements data includes a list of interactive features and corresponding feature characteristics by which a user operates the HMI device, the system objectives data includes a list of design objectives by which the user interacts with the HMI device and uses the interactive features, and the source code data includes an HMI system architecture for the HMI device.

14. An automated design system for configuring a human-machine interface (HMI) device, the automated design system comprising:

a large-language model (LLM) module programmed to:

receive a set of HMI system development metrics including at least one of system requirements data, system objectives data, or source code data;

generate, using the received set of HMI system development metrics, an interaction sequence script containing a sequence of steps for executing an HMI feature on the HMI device;

a system controller configured to:

configure the HMI device using the received set of HMI system development metrics; and generate and store a feedback log containing feedback data received from a group of test clinic contributors using the interaction sequence script to test the HMI feature on the configured HMI device; and a multimodal generative artificial intelligence (AI) module programmed to generate a set of proposed HMI changes using the feedback data, wherein the system controller is further configured to reconfigure the HMI device using a subset of HMI changes selected from the set of proposed HMI changes.

15. A non-transient, computer-readable medium (CRM) storing instructions executable by one or more system controllers and/or one or more system control modules of an automated design system for configuring a human-machine interface (HMI) device, the instructions, when executed, causing the automated design system to perform operations comprising:

receiving, via a large-language model (LLM) module, a set of HMI system development metrics including at least one of system requirements data, system objectives data, or source code data;

generating, via the LLM module using the received set of HMI system development metrics, an interaction sequence script containing a sequence of steps for executing an HMI feature on the HMI device;

configuring the HMI device using the received set of HMI system development metrics;

generating a feedback log containing feedback data received from a group of test clinic contributors using the interaction sequence script to test the configured HMI device;

generating, via a multimodal generative artificial intelligence (AI) module, a set of proposed HMI changes using the feedback data; and reconfiguring the HMI device using a subset of HMI changes selected from the set of proposed HMI changes.

16. The non-transient CRM of claim 15, wherein the feedback data in the feedback log includes multiple feedback statements, and wherein generating the set of proposed HMI changes includes:

determining an intent integer for each of the feedback statements, the intent integer being predictive of a contributor intent of a contributor who produced the feedback statement; and determining a sentiment integer for each of the feedback statements, the sentiment integer being predictive of a contributor sentiment of the contributor who produced the feedback statement.

17. The non-transient CRM of claim 15, wherein generating the set of proposed HMI changes further includes calculating a weighted score $W_n$ for each of the feedback statements as:

$$W_n = S_n * U_n 1 + S_n * U_n 2 \ldots S_n * U_n i = \sum_{i=1}^{j} S_n * U_n i$$

where $S_n$ is the sentiment integer of feedback statement n=1 to j; and $U_n$ is the intent integer of the feedback statement N.

18. The non-transient CRM of claim 15, wherein the instructions further cause the automated design system to select the subset of HMI changes by filtering the set of proposed HMI changes based on the weighted scores of the feedback statements and a utility function predictive of a return on investment (ROI) for each of the proposed HMI changes.

19. The non-transient CRM of claim 15, wherein generating the interaction sequence script includes a Bidirectional Encoder Representations from Transformers (BERT) language model summarizing each of multiple HMI features in the set of HMI system development metrics to include a feature objective, a feature process, and a feature result.

20. The non-transient CRM of claim 15, wherein the system requirements data includes a list of interactive features and corresponding feature characteristics by which a user operates the HMI device, the system objectives data includes a list of design objectives by which the user interacts with the HMI device and uses the interactive features, and the source code data includes an HMI system architecture for the HMI device.

* * * * *